United States Patent [19]

Kwas

[11] 3,850,422
[45] Nov. 26, 1974

[54] QUICK-ACTING VISE
[76] Inventor: Edward Kwas, 4837 N. Opal, Norridge, Ill. 60656
[22] Filed: Feb. 15, 1974
[21] Appl. No.: 442,922

[52] U.S. Cl. .............................. 269/196, 269/204
[51] Int. Cl. ............................................. B25b 1/02
[58] Field of Search ........... 269/165, 188, 196, 197, 269/198, 199, 200, 203, 204, 230

[56] References Cited
UNITED STATES PATENTS

| 227,582 | 5/1880 | Riley | 269/200 |
|---|---|---|---|
| 2,568,393 | 9/1951 | Helbig | 269/203 |
| 2,612,805 | 10/1952 | Heinrich | 269/196 |

OTHER PUBLICATIONS
Doods, Quick-Acting Self-Aligning Toolmakers Drill Vise, American Machinist, May 9, 1946, page 143.

Primary Examiner—Roy Lake
Assistant Examiner—Mark S. Bicks
Attorney, Agent, or Firm—Thomas R. Vigil

[57] ABSTRACT

A quick-acting vise comprising a base, a stationary jaw fixed to the base, a movable jaw positioned for movement on the base, a spindle connected to the movable jaw, and a locking assembly which is secured to the base and through which the spindle is slidably movable. The locking assembly includes a block having a cavity therein and two openings through respective end walls of the block communicating with the cavity. The cavity has a generally "U" shape cross section. A bullet shaped cam member is situated within the cavity and has a bore on an eccentric longitudinal axis thereof. The spindle extends through the bore in the cam member and the bore and the spindle have corresponding mating cross sections. A spring is situated in the cavity and biases a round end of the cam member against a curved wall surface of the cavity. The cam member, the cavity, the openings and the spindle are configured, dimensioned and located so that rotation of the spindle causes rotation of the rounded end of the cam member against the curved wall surface resulting in forward movement of the cam member, and the spindle also by reason of frictional engagement between the bore and the spindle, toward the stationary jaw until the spindle is locked in place by frictional engagement between a surface on the cam member and a wall surface of the cavity and between portions of the peripheral surfaces of the spindle and interior wall surfaces of the openings.

12 Claims, 6 Drawing Figures

QUICK-ACTING VISE

BACKGROUND AND SUMMARY OF THE INVENTION

The present invention relates to a quick-acting vise which enables one to quickly move one jaw of the vise against a workpiece positioned adjacent a fixed jaw of the vise and then to lock the movable jaw in place.

Heretofore, various quick-acting vises have been proposed such as, for example, the vises disclosed in U.S. Pat. Nos. 2,563,467, 2,846,907 and 3,752,466. These previously proposed vises provided for slidable movement of a spindle mounting a movable jaw against a workpiece situated adjacent a fixed jaw. Then the slidable spindle is locked in place and preferably, at the same time urged toward the jaws so that the movable jaw and the fixed jaw tightly grip the workpiece. It will be readily apparent that operation of a vise utilizing a sliding and preferably nonthreaded, spindle in a quick-acting vise is much faster than the operation of a threaded spindle in a conventional vise.

The quick-acking vise of the invention to be disclosed hereinafter provides advantages over the known quick-acting vises in that the vise to be disclosed hereinafter is very simple to operate, can be operated with one hand leaving the other hand free to position the workpiece in the vise, has fewer parts then the known vises thereby providing an economy in manufacture, assembly and cost, utilizes a nonthreaded spindle, and is simple to operate by merely sliding the spindle of the vise forward until a workpiece is situated between a fixed jaw of the vise and a movable jaw at the end of the spindle followed by rotation of the spindle, either clockwise or counterclockwise, to lock the spindle in place.

According to the invention, there is provided a quick-acting vise which includes a base, a stationary jaw fixed to the base, a locking assembly including a block fixed to the base and spaced from the stationary jaw, a cavity in the block, openings through opposite end walls of the block, the openings being coaxial on an axis perpendicular to the stationary jaw, a spindle received through the openings and having a movable jaw fixed to one end thereof and slidable on the base, a cam member having a bore on an axis eccentric to a central axis of the cam member and a spring urging cam member against a wall surface of the cavity adjacent one of the openings. The cam member is received in the cavity with the spindle extending through the bore of the cam member. The bore and the spindle have substantially the same cross section. Preferably, a portion of the cavity is defined by a curved wall surface adjacent the opening in the block farthest from the jaws and the cam member has a rounded end surface adjacent the bore, the rounded surface being situated adjacent the curved wall surface. The spring is situated within the cavity in position to urge the cam member against the curved wall surface whereby when the spindle is rotated, the rounded surface adjacent the bore will engage and move along the curved wall surface causing the cam member to move towards the jaws, the fricitional engagement between the spindle and the bore causing the spindle to be carried along with the cam member until a surface on the cam member bears against a wall surface of the cavity and portions of the outer surface of the spindle bear against a side wall surface in each opening, thereby locking the spindle in place.

DESCRIPTION OF THE PREFERRED EMBODIMENT

Figure 1:
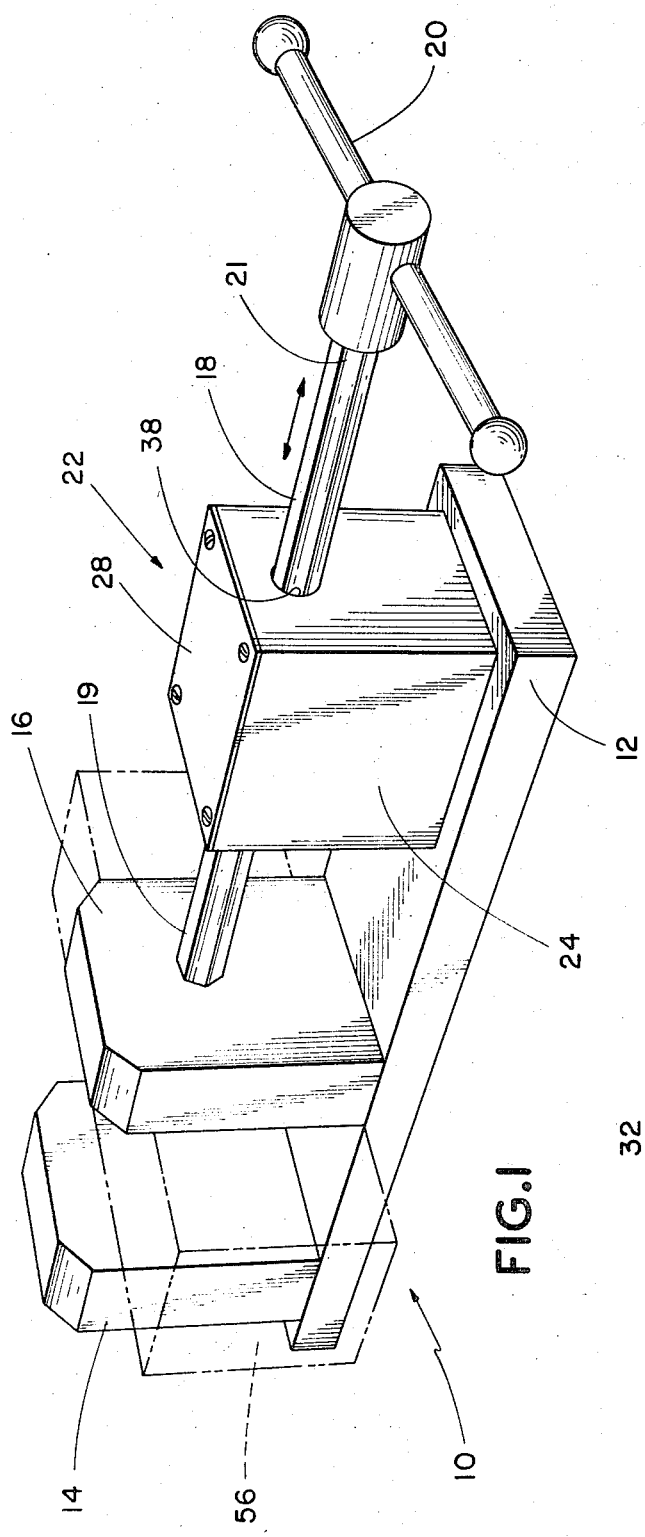
FIG. 1 is a perspective view of the vise of the invention.
Figure 2:
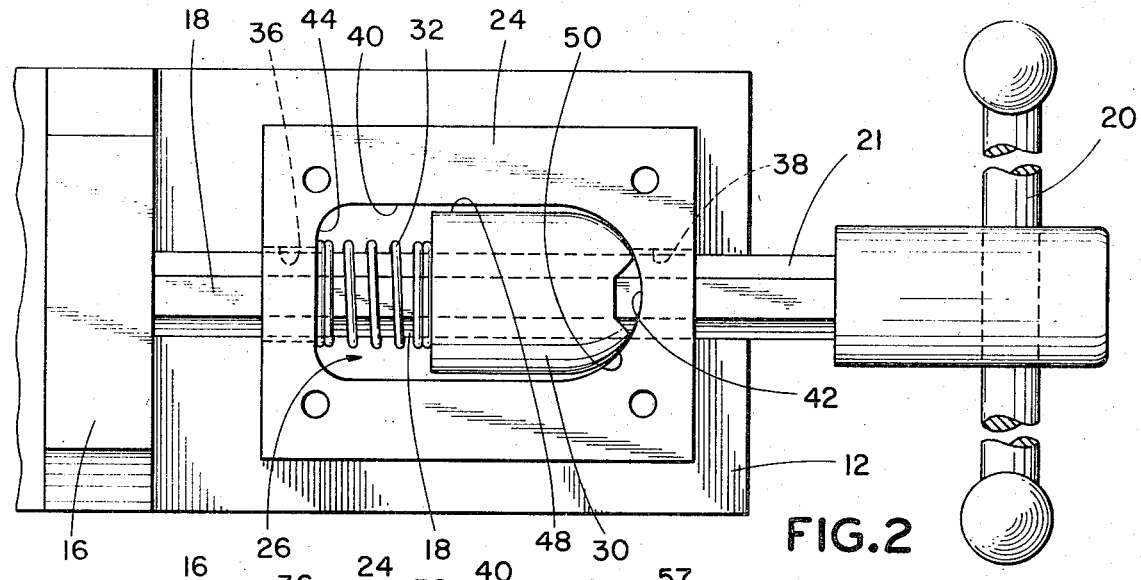
FIG. 2 is a top plan view of the locking assembly of the vise shown in FIG. 1 with the cover plate of the assembly removed.
Figure 4:
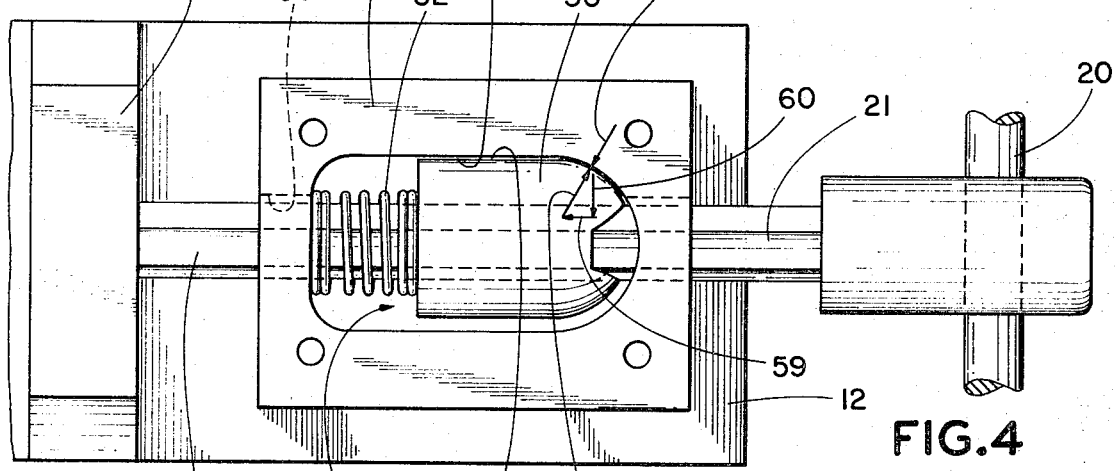
FIG. 4 is a top plan view similar to FIG. 2 after the spindle has been rotated to lock the spindle in place.

Referring to the drawings in greater detail, the quick-acting vise of the invention is identified by the reference numeral 10 in FIG. 1 and includes a base 12, a stationary jaw 14 fixed to one end of the base 12, a movable jaw 16 movable on the base 12, a spindle 18 connected at one end 19 to the movable jaw 16 and having a hand manipulatable, slidable crossbar 20 mounted to the other end 21 thereof, and a locking assembly 22 through which the spindle 18 extends. The locking assembly 22 includes a block 24 fixed to the base 12. As best shown in FIGS. 2 and 4, a cavity 26 is formed in the block 24 and is covered, as shown in FIG. 1, by a cover plate 28 when the vise 10 is assembled. Inside the cavity 26 is situated a cam member 30 and a spring 32. As shown in FIG. 2, the block 24 has an opening 36, 38 in each end wall thereof through which the spindle 18 extends, the openings 36 and 38 communicating with the cavity 26 and being coaxial on an axis which is perpendicular to the jaws 14 and 16.

As best shown in FIGS. 2 and 4 the cavity 26 has a generally "U" or tombstone cross section defined between parallel side wall surfaces 40, a curved wall surface 42 adjacent the opening 38 and a flat end wall surface 44 adjacent the opening 36.

Figure 6:
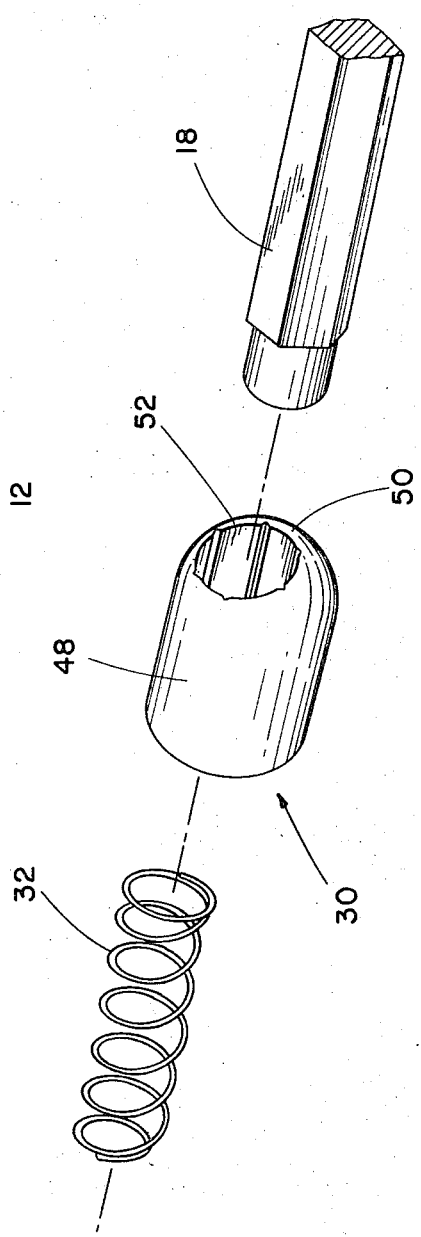
FIG. 6 is an exploded perspective view of a portion of the spindle, the cam member, and the spring received in the cavity of the block of the locking assembly.

Referring to FIG. 6, the cam member 30 has a generally bullet shape with a cylindrical side surface 48 and a rounded or spherical end surface 50; also the cam member 30 has a longitudinal bore 52 therethrough which has an axis eccentric to the central longitudinal axis of the cam member 30. The spindle 18 and the bore 52 have substantially the same cross section and in the illustrated embodiment they have a hexagonal cross section. As is apparent from the figures, the spindle 18 is inserted through the opening 38 and through the bore 52 in the cam member received in the cavity 26 and then through the spring 32 and out the other opening 36.

In the operation of the vise 10, a workpiece 56 is first positioned adjacent the jaw 14 (FIG. 1) and then the spindle 18 is pushed inwardly of the vise 10 to bring the jaw 16 against workpiece 56. Then the cross bar 20 is manipulated to rotate the spindle 18 from the position shown in FIG. 2 to the position shown in FIG. 4 or to the mirror image thereof, depending upon which way the spindle 18 is rotated. This rotation of the spindle 18 causes rotation of the cam member 30 which is biased by the spring 32 against the curved wall surface 42. This rotation of the cam member 30 causes the rounded end surface 50 to move along the curved wall surface 42 resulting in forward movement of the cam member 30 to the position shown in FIG. 4. At the same time the frictional engagement between the outer surface of the spindle 18 and the inner surface of the bore 52 causes the spindle to be carried forward thereby causing the jaw 16 to bear against the workpiece 56 to hold the same tightly between the jaws 14 and 16. As the spindle 18 is rotated, the action-reaction as shown by force vectors 57, 58 in FIG. 4 between the curved wall surface 42 and the rounded end surface 50 results in the development of not only an axial force on the cam member 30 indicated by the force vector 59 toward the jaw 16 but also a lateral force indicated by the force vector 60 which causes surfaces of the bore 52 to bear against the spindle 18 and portions of the surface areas on the spindle 18, namely a portion of two edges 60 and 62 of the spindle 18 (FIG. 5) to bear against a wall surface in each one of the openings 36 and 38 as best shown in FIG. 4. When this occurs, the spindle 18 is locked in place and the workpiece 56 is held firmly between the jaws 14 and 16. It will be apparent from FIGS. 3 and 5 that there is a small lateral movement of the spindle 18 as the above locking action takes place and depending on the configuration of the parts and the axial pressure applied to spindle 18 the locking can take place between the cam side surface 48 and wall surface 40 as well as between the cam end surface 50 and curved wall surface 42.

Figures 3, 5:
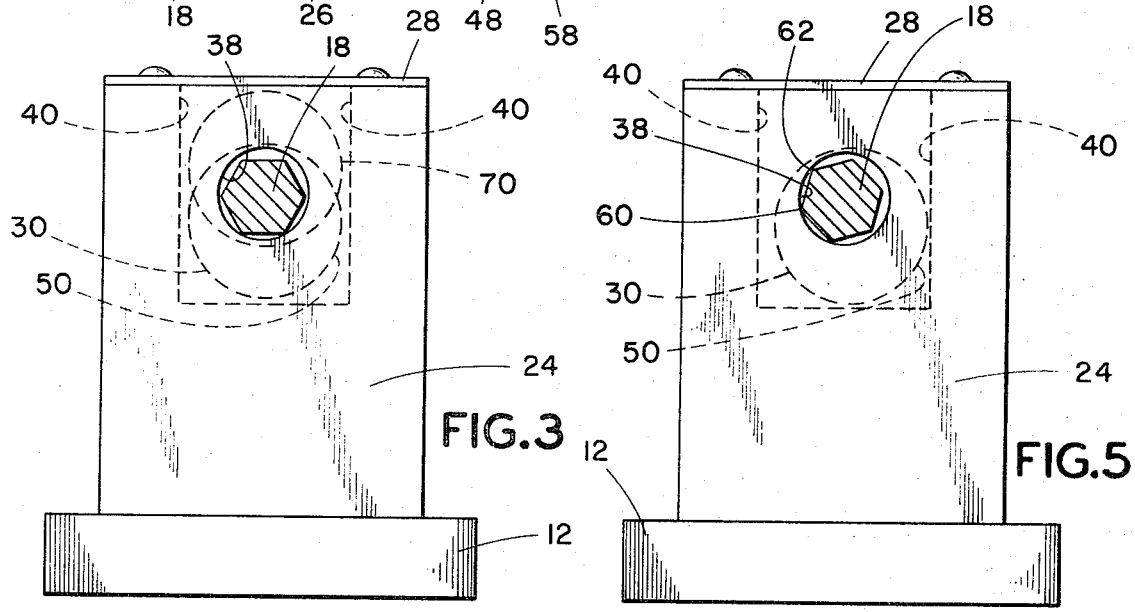
FIG. 3 is an end elevational view of the locking assembly and is taken along line 3—3 of FIG. 2.
FIG. 5 is a side elevational view of the locking assembly taking along line 5—5 of FIG. 4.

As best shown in FIGS. 3 and 5, the openings 36 and 38 are preferably cylindrical to permit smooth rotation of the spindle 18 therein. Also, the openings 36 and 38 are dimensioned so as to be slightly larger than the maximum diameter of the spindle 18. Additionally, it will be apparent that the rounded end surface 50 of the cam member 30 and the curved wall surface 42 in the cavity 26 have essentially the same radius of curvature although these radii of curvature need not be exactly the same. Furthermore, it will be apparent that the width of the cavity 26 between the wall surfaces 40 is dimensioned so as to be somewhat greater than the diameter of the cam member 30 but less than twice the maximum eccentric radii to permit limited rotation of the cam member 30 within the cavity 26. The width of the cavity 26 can be greater if desired.

It will be apparent to those skilled in the art that certain modifications can be made to the vise 10. For example, the cam member 30 can be spherical in shape as opposed to being bullet-shaped. Also, the cross section of the spindle 18 and the bore 52 do not have to be hexagonal so long as the cross section is not circular to enable the spindle 18 to rotate the cam member 30. Additionally, the base 12 can take the form of at least two rods with the stationary jaw 14 fixed to the rods and the movable jaw 16 slidably journaled on the rods with the block 24 fixed to the rods. Moreover, the end surface 50 can be frusto-conical and the wall surface 42 can have a mating trapezoidal cross section although the manufacture of parts configured in this manner is more expensive. Still further, the locking assembly 22 can be utilized in other clamping devises such as a C clamp. It is further to be noted that the radius of curvature of the rounded surface 50 and the curved wall surface 42 can be varied as desired, the larger the radius the tighter the locking action.

From the foregoing description it will be apparent that the vise 10 provides a number of advantages such as simplicity in design with the locking assembly comprising only three parts (the block 24 configured as described, the cam member 30 and the spring 32) in addition to the non-threaded spindle 18. Also, the spindle 18 can be rotated clockwise or counterclockwise to cause the movable jaw 16 to be moved forward and then locked in place. Further, the cam member 30 can be mounted in two positions as indicated by the position shown in phantom lines at 70 in FIG. 3 so that after portions of the wall surface 42 are worn down, the vise 10 can be disassembled and the cam member 30 can be "flipped over" in position for the end surface 50 to "ride on" other portions of the wall surface 42. Additionally, it will be apparent that the spindle 18 can be manipulated with one hand leaving the other hand free to position the workpiece 56. Furthermore, with the simplicity of design, the vise 10 is simple and inexpensive to manufacture and assemble.

I claim:

1. A clamping device comprising a fixed jaw, a locking assembly, support means mounting said fixed jaw and said locking assembly in spaced apart relationship, said locking assembly including a block fixed to said support means said block having a cavity therein and aligned openings in the end walls thereof which communicate with said cavity and which are coaxial on an axis generally perpendicular to said fixed jaw, cam means in said cavity positioned to engage a cam forming wall surface in said cavity, said cam means having a bore therethrough, a spindle slidably received through said bore, said bore and spindle having similar cross sections, a movable jaw positioned between said fixed jaw and said block and connected to one end of said spindle, and means in said cavity urging said cam means against the end of said cavity farthest from said fixed jaw, said cam means, said cavity, said spindle and said openings being configured, dimensioned and arranged so that when said spindle is rotated, the frictional engagement between said spindle, said bore and said openings, and between said cam means and a wall surface of said cavity cause said spindle to be moved axially towards said fixed jaw and then locked in place with said cam means bearing against a wall surface of said cavity, wall surfaces of said bore bearing against said spindle and said spindle bearing against wall surfaces of said openings.

2. A device according to claim 1 wherein said support means comprises a base.

3. A device according to claim 1 including means connected to the other end of said spindle for manipulating said spindle.

4. A device according to claim 1 wherein said cavity has a curved wall surface adjacent said opening farthest from said jaws and wherein the surface area on said cam means adjacent one end of said bore is rounded and is juxtaposed to said curved wall surface of said cavity.

5. A device according to claim 1 wherein said cam means and said cavity are configured and dimensioned so that said spindle can be rotated clockwise or counterclockwise to cause said movable jaw to be moved towards said stationary jaw and locked in place.

6. A device according to claim 1 wherein said cam means has a generally bullet shape with a generally cylindrical peripheral side surface and a generally spherical end surface and said bore extends longitudinally through said cam means and has an axis eccentric to the central longitudinal axis of said cam means.

7. A device according to claim 1 wherein said urging means comprises a spring.

8. A device according to claim 1 wherein said cross section of said spindle and said bore is hexagonal.

9. A device according to claim 1 wherein said cavity has a generally U-shaped cross section.

10. A device according to claim 1 wherein said openings through said block communicating with said cavity have a generally circular cross section.

11. A device according to claim 1 wherein said cavity is defined in part by spaced, parallel wall surfaces parallel to the axis of said openings and in part by a curved wall surface adjacent said opening farthest from said jaws, said curved wall surface merging with said parallel wall surfaces.

12. A device according to claim 1 wherein said cam means comprises a cam member which has a rounded surface adjacent one end of said bore.

* * * * *